(12) United States Patent
Conner

(10) Patent No.: US 6,771,592 B1
(45) Date of Patent: Aug. 3, 2004

(54) VOICE AND DATA WIRELESS COMMUNICATION SYSTEM WITH IMPROVED ERROR RECOVERY

(75) Inventor: Keith Faulk Conner, Boonton, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 636 days.

(21) Appl. No.: 09/705,663

(22) Filed: Nov. 3, 2000

(51) Int. Cl.[7] .............................................. G01R 31/08
(52) U.S. Cl. ..................... 370/216; 375/224; 714/48; 379/93.01; 370/332; 370/522
(58) Field of Search ......................... 714/48, 699, 776, 714/747; 370/216, 389, 392, 465, 394, 314, 331, 332, 522; 379/93.09, 93.01, 90.01, 88.01, 100.01; 375/224

(56) References Cited

U.S. PATENT DOCUMENTS

| | | | | |
|---|---|---|---|---|
| 5,822,315 A | * | 10/1998 | de Seze et al. | ............. 370/337 |
| 5,867,510 A | * | 2/1999 | Steele | ......................... 714/758 |
| 5,940,405 A | * | 8/1999 | Sakuma | ...................... 370/468 |
| 6,553,065 B1 | * | 4/2003 | Tuutijarvi | ................... 375/224 |

FOREIGN PATENT DOCUMENTS

| | | | | |
|---|---|---|---|---|
| WO | WO 00/45555 | | 8/2000 | ........... H04L/12/64 |
| WO | WO00/45555 | * | 8/2000 | ........... H04L/12/64 |

OTHER PUBLICATIONS

IBM Technical Disclosure, "Error Control for Voice/Data Packet Network", Dec. 1, 1986, vol. 29, Issue 7, pp 3092–3095.*

Jauregui Acosta et al., "Internet Services on Enhanced CDPD Systems", Jul. 6–8, 1999, Proceedings IEEE International Symposium on Computers and Communications, IEEE Commun. Soc., pp 87–92, 1999.*

* cited by examiner

*Primary Examiner*—Albert Decady
*Assistant Examiner*—John P Trimmings

(57) ABSTRACT

A method is provided for detecting and recovering from missed control words that signify a transition to or from a speech mode to a data mode in a communication channel. When in a speech mode, speech information is checked for errors. If an error is detected, the next frame or segment of information is assumed to be data information. The data information is examined for valid information such as a valid header. If a valid header is detected, data mode is assumed and if a valid header is not detected, speech mode is assumed.

7 Claims, 1 Drawing Sheet

VOICE AND DATA WIRELESS COMMUNICATION SYSTEM WITH IMPROVED ERROR RECOVERY

BACKGROUND OF THE INVENTION

1. Field of the Invention

The present invention relates to communications; more specifically, wireless communications.

2. Description of the Related Art

In the past, communication channels were used to communicate both speech and data related information from a transmitter to a receiver. When in the first mode, the communication channel carried speech information and when in a second mode the communication channel carried data information. The transition from speech to data mode or from data to speech mode was indicated through the use of one or more control words. Unfortunately, if the control word was missed or misinterpreted, a receiver would not detect this transition between modes.

SUMMARY OF THE INVENTION

The present invention provides a method for detecting and recovering from missed control words that signify a transition to or from a speech mode to a data mode or from a data mode to a speech mode in a communication channel. When in a speech mode, speech information is checked for errors. If an error is detected, the next frame or segment of information is assumed to be data information. The data information is examined for valid information such as a valid header. If a valid header is detected, data mode is assumed and if a valid header is not detected, speech mode is assumed.

DETAILED DESCRIPTION

Figure 1:
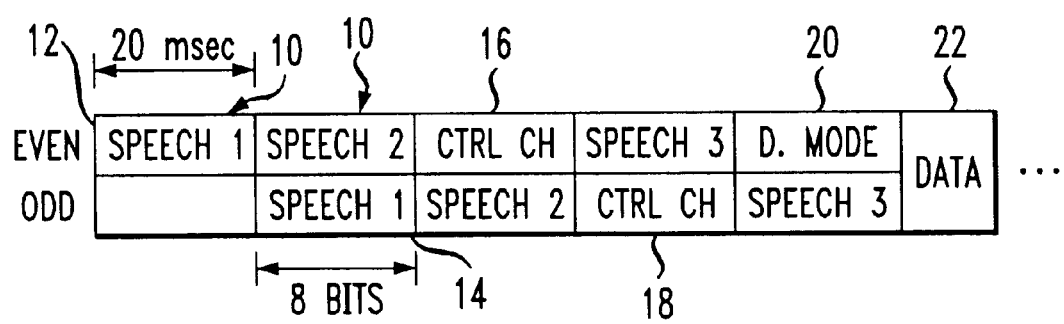
FIG. 1 illustrates the structure of a communication channel.
Figure 1:
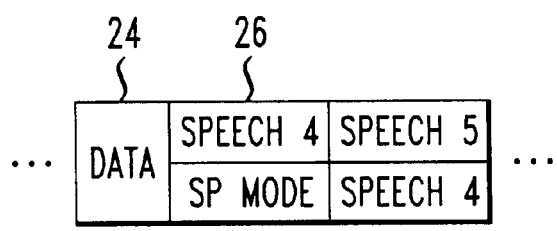

FIG. 1 illustrates a communication channel in a wireless communications system that can transmit in a speech or data mode to a receiver. The communication channel is broken into segments or frames of a known duration such as 20 milliseconds. When in the speech mode, the frames are broken into an even portion and an odd portion. For example, each 20 millisecond segment or frame 10 is broken into an even and odd portion where the even portion corresponds to the even bits within the frame and the odd portion corresponds to the odd bits within the frame. When transmitting speech information, the speech information is divided diagonally across adjacent frames. For example, a block of speech information is divided between even portion 12 of a preceding frame 10 and odd portion 14 of a subsequent frame 10. As a result, the even bits associated with a block of speech data are in a frame immediately preceding the frame containing the odd bits associated with the same block of the speech data.

When in the speech mode, control channel information such as information used for handoffs between base stations in a cellular communication system may be used in place of a block of speech data. As with the blocks of speech data, the even bits associated with the control channel block are transmitted in a preceding frame 16 and the odd bits associated with the control channel block are transmitted in the immediately following frame 18. Control channel information is distinguished from speech information through the use of in-band signaling bits. The in-band signaling bits are predetermined bits interleaved with the bits carrying speech or control channel information. The bits are used to indicate when a frame contains speech information, control channel information or other types of information needed to maintain communications.

When transitioning from a speech mode to a data mode, a control word such as a data mode control word is included in a frame 20 immediately preceding a frame 22 that will contain data information. The data mode control word is a predetermined pattern that is readily recognized and distinguishable from typical speech data. Once in the data mode, frames 22 through 24 contain data that may be used to convey information such as packet voice control, messaging information such as e-mail information or paging information, Internet information such as, for example, web page information, or other types of information requested by a user.

The transition from data mode to speech mode is indicated in a first frame 26 containing speech information by the inclusion of a speech mode control word. The speech mode control word is a pattern of bits that is predetermined and unlikely to be seen in typical speech or data information. Once in the speech mode, speech information is diagonally interleaved using even and odd portions spread across consecutive frames as discussed above.

When in the speech mode, speech information is subjected to an error correction process such as a cyclic redundancy check (CRC) by a receiver. If the check indicates there are no errors, speech mode is continued and the receiver continues to treat the information as speech information. If an error is detected, the next frame is assumed to contain data information. The data information is examined for validity by checking for a known bit pattern such as a valid header. If a valid header is detected; data mode is used to receive subsequent frames of information until a speech mode control word indicates otherwise. If the data information fails the examination and does not contain a known bit pattern such as a valid header, speech mode is continued for subsequent frames of information until a data mode is indicated by a data mode control word or by the above-described process.

The invention claimed is:

1. A method comprising:
   receiving speech related information in a communication frame;
   detecting an error in the speech related information;
   checking for valid data information in a subsequent communication frame in response to detecting the error;
   receiving frames following the checked subsequent communication frame as containing data information if valid data information was detected in the checked subsequent communication frame; and
   receiving frames following the checked subsequent communication frame as containing speech related information if valid data information was not detected in the checked subsequent communication frame.

2. A method as claimed in claim 1, wherein the data information relates to packet voice control information.

3. A method as claimed in claim 1, wherein the data information relates to messaging information.

4. A method as claimed in claim 3, wherein the data information relates to e-mail information.

5. A method as claimed in claim 3, wherein the data information relates to paging information.

6. A method as claimed in claim 3, wherein the data information relates to Internet information.

7. A method as claimed in claim 6, wherein the data information relates to web page information.

* * * * *